(12) United States Patent
Hirabayashi (10) Patent No.: US 10,840,799 B2
(45) Date of Patent: Nov. 17, 2020

(54) POWER SUPPLY APPARATUS AND IMAGE FORMING APPARATUS

(71) Applicant: CANON KABUSHIKI KAISHA, Tokyo (JP)

(72) Inventor: Jun Hirabayashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/418,118

(22) Filed: May 21, 2019

(65) Prior Publication Data

US 2019/0379275 A1   Dec. 12, 2019

(30) Foreign Application Priority Data

Jun. 7, 2018 (JP) .................................. 2018-109580

(51) Int. Cl.
| | | |
|---|---|---|
| *H02M 1/14* | (2006.01) | |
| *G03G 15/00* | (2006.01) | |
| *H02M 3/335* | (2006.01) | |
| *H02M 1/08* | (2006.01) | |

(52) U.S. Cl.
CPC .............. *H02M 1/14* (2013.01); *G03G 15/80* (2013.01); *H02M 1/08* (2013.01); *H02M 3/33553* (2013.01)

(58) Field of Classification Search
CPC ........... H02M 1/08; H02M 1/14; G03G 15/80
See application file for complete search history.

(56) References Cited

U.S. PATENT DOCUMENTS

| | | | | |
|---|---|---|---|---|
| 4,727,463 A | * | 2/1988 | Suzuki ............. | H02M 3/33507 363/21.17 |
| 5,532,913 A | * | 7/1996 | Suzuki .................... | H02M 7/48 363/109 |
| 5,923,542 A | * | 7/1999 | Sasaki ..................... | H02M 7/48 363/16 |
| 6,381,152 B1 | * | 4/2002 | Takahashi ............ | H02H 7/1206 363/21.06 |
| 6,462,437 B1 | * | 10/2002 | Marmaropoulos ..... | H02J 9/005 307/125 |
| 9,306,466 B2 | | 4/2016 | Hirabayashi | |
| 9,343,985 B2 | * | 5/2016 | Hirabayashi ....... | G03G 15/5004 |
| 9,904,232 B2 | * | 2/2018 | Hirabayashi .......... | G03G 15/80 |
| 10,264,185 B2 | | 4/2019 | Hirabayashi | |

(Continued)

FOREIGN PATENT DOCUMENTS

JP   9-191644   7/1997

*Primary Examiner* — Yusef A Ahmed
(74) *Attorney, Agent, or Firm* — Venable LLP (57) ABSTRACT

The power supply apparatus includes a switching element configured to drive a transformer, a primary side and a secondary side of the transformer being insulated from each other, a control unit configured to output a pulse signal for driving the switching element, and a comparing unit configured to compare a target voltage of an output voltage that is output from the secondary side of the transformer and the output voltage, and to control the output voltage to be the target voltage, wherein the comparing unit cuts off an input of the pulse signal to the switching element in a case where the output voltage is larger than the target voltage, and wherein the control unit determines a frequency or an on-duty ratio of the pulse signal according to the target voltage.

13 Claims, 7 Drawing Sheets

(56) References Cited

U.S. PATENT DOCUMENTS

| | | | | |
|---|---|---|---|---|
| 2006/0098463 A1* | 5/2006 | Baurle | H02M 3/33507 | |
| | | | 363/21.01 | |
| 2006/0158909 A1* | 7/2006 | Hawley | H02M 1/32 | |
| | | | 363/21.12 | |
| 2008/0136341 A1* | 6/2008 | Araki | H02M 1/36 | |
| | | | 315/209 R | |
| 2008/0136342 A1* | 6/2008 | Tamegai | H02M 1/32 | |
| | | | 315/209 R | |
| 2009/0201705 A1* | 8/2009 | Murata | H02M 1/32 | |
| | | | 363/53 | |
| 2010/0208502 A1* | 8/2010 | Horii | H02M 3/33507 | |
| | | | 363/131 | |
| 2010/0209132 A1* | 8/2010 | Takami | G03G 15/5004 | |
| | | | 399/88 | |
| 2011/0085356 A1* | 4/2011 | Morota | H02M 1/44 | |
| | | | 363/21.04 | |
| 2013/0077350 A1* | 3/2013 | Mao | H02M 3/33523 | |
| | | | 363/16 | |
| 2013/0134892 A1* | 5/2013 | Kado | H02M 3/33523 | |
| | | | 315/206 | |
| 2014/0301117 A1* | 10/2014 | Hirabayashi | G03G 15/5004 | |
| | | | 363/21.15 | |
| 2014/0328090 A1* | 11/2014 | Takahashi | H02M 3/33507 | |
| | | | 363/21.17 | |
| 2015/0214845 A1* | 7/2015 | Kawashima | H02M 3/33523 | |
| | | | 363/21.18 | |
| 2015/0355593 A1* | 12/2015 | Uchiyama | G03G 15/80 | |
| | | | 399/88 | |
| 2016/0238983 A1* | 8/2016 | Hirabayashi | G03G 15/80 | |
| 2016/0352234 A1* | 12/2016 | Imai | H02M 3/158 | |
| 2016/0358705 A1* | 12/2016 | Lin | H01F 27/06 | |
| 2018/0010739 A1 | 1/2018 | Hirabayashi | | |
| 2018/0083540 A1* | 3/2018 | Pham | H02M 1/08 | |
| 2018/0335714 A1 | 11/2018 | Hirabayashi | | |
| 2018/0335747 A1 | 11/2018 | Hirabayashi | | |
| 2019/0044450 A1* | 2/2019 | Muto | H02M 1/08 | |
| 2019/0191095 A1 | 6/2019 | Hirabayashi | | |

* cited by examiner

POWER SUPPLY APPARATUS AND IMAGE FORMING APPARATUS

BACKGROUND OF THE INVENTION

Field of the Invention

The present invention relates to a power supply apparatus and an image forming apparatus. In particular, the present invention relates to various kinds of high voltage power supplies required in electrophotography-system image forming apparatuses. Here, image forming apparatuses include, for example, a copying machine, a laser printer, a LED printer, and an electrophotography facsimile.

Description of the Related Art

Conventionally, the electrophotography-system image forming apparatus has been widely used that copies an image on a recording paper by using the electrophotography technology. The image forming apparatus irradiates light such as laser according to an image to be copied onto a photosensitive member uniformly charged to a positive or negative high potential, and forms a latent image on the photosensitive member with an electrostatic charge. A developer, such as a toner, is thrown by an electrostatic force to a part on the photosensitive member where the latent image is formed, and the latent image is developed on the photosensitive member. Next, a recording paper is placed on the developed developer, the electric charge having the polarity opposite to the polarity maintained by the developer is given from a rear surface of the recording paper, and the developer is made to stick to a record paper surface by the electrostatic force so as to be transferred to the record paper surface. Thereafter, heat and pressure are applied to the recording paper on which the developer was transferred, so as to fix the transferred developer. In this manner, in the electrophotography system, since movement of the developer utilizing the electrostatic force is performed in each process, power supplies having various polarities and various high voltages are required. Although there are various systems for such a high voltage power supply, Japanese Patent Application Laid-Open No. H09-191644 can particularly be listed as a system including a small number of components and capable of being configured at low cost.

Figure 6:
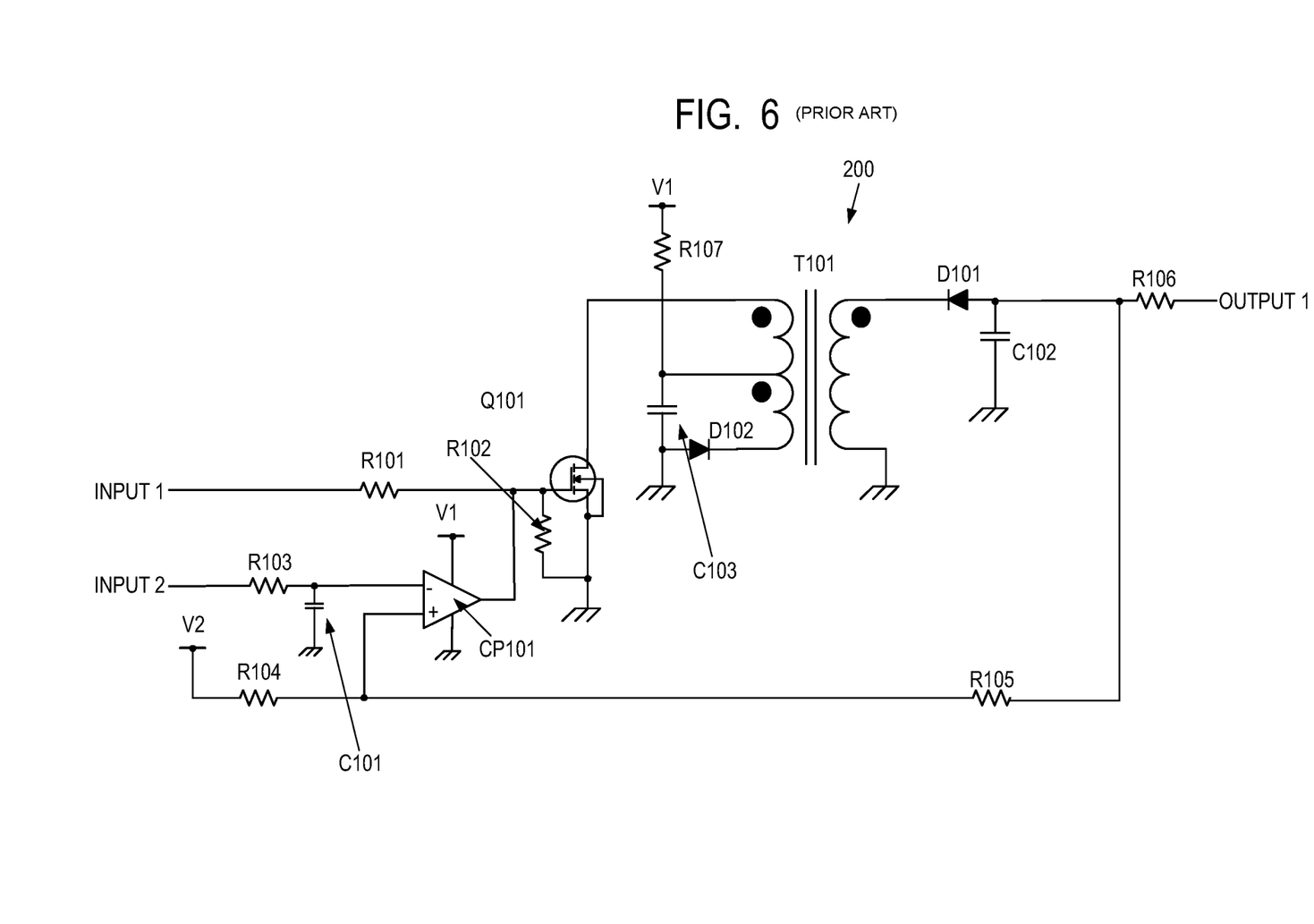
FIG. 6 is a circuit diagram illustrating a power supply apparatus in a conventional example.
Figure 7A:
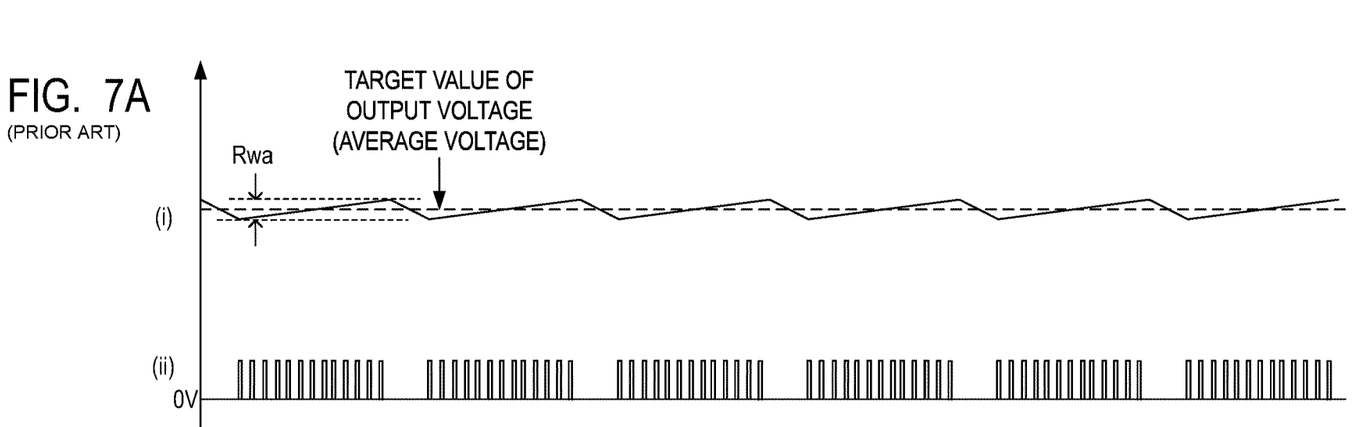
FIG. 7A and FIG. 7B are graphs illustrating the variation in the ripple of the output voltage in the conventional example.
Figure 7B:
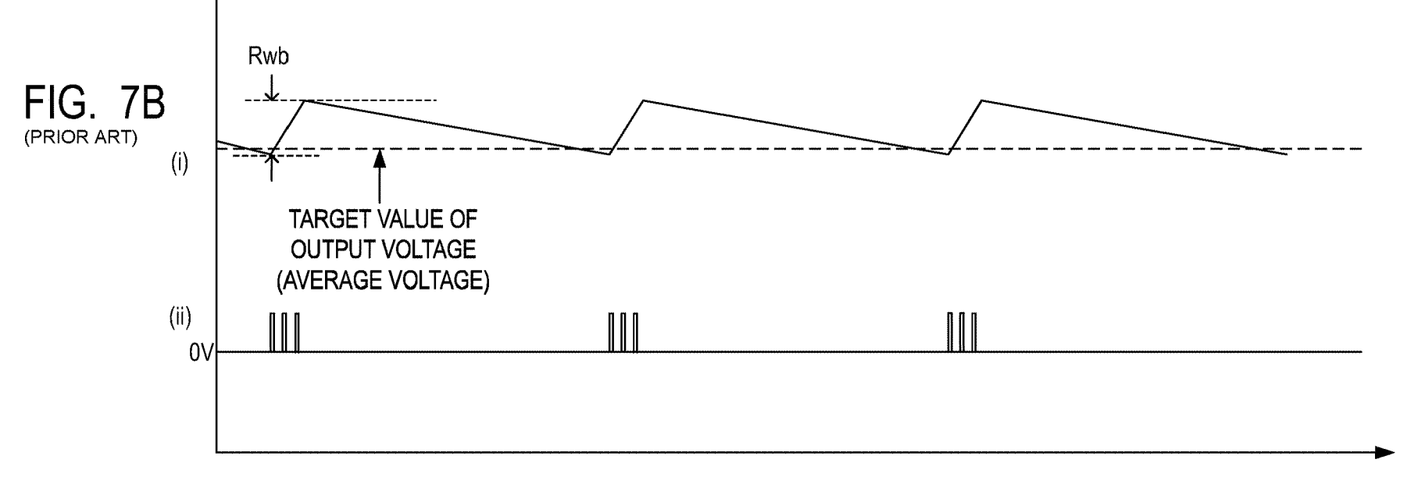

However, in the power supply apparatus of the conventional example, there is a problem in which the ripple of an output voltage significantly changes according to the voltage and current that are being output. FIG. 6 is a circuit diagram showing the conventional power supply apparatus. A power supply apparatus 200 illustrated in FIG. 6 includes a comparator CP101, and performs feedback control of the output voltage output from an output 1. In a case where a load connected to the output 1 is a load having a constant resistance value, due to the effect of the feedback control, the higher the voltage of the output 1 is, the more the current from the output 1 flows, and in order to maintain the voltage, the oscillating frequency of a FET Q101 becomes high. On the other hand, in a case where the voltage of the output 1 is low, the oscillating frequency of the FET Q101 becomes low. This situation is illustrated in FIG. 7A and FIG. 7B. FIG. 7A is a graph illustrating the ripple of the output voltage and a driving voltage in a case where the output voltage is high, and FIG. 7B is a graph illustrating the ripple of the output voltage and the driving voltage in a case where the output voltage is low. Each horizontal axis represents the time. Additionally, the target value (also the average voltage) of the output voltage is shown by a broken line in each of the figures. In a circuit of this system, there is a tendency that the higher the output voltage is (FIG. 7A), the smaller the ripple becomes, and the lower the output voltage is (FIG. 7B), the larger the ripple becomes. This tendency is caused by the output current, and even if the output voltage is the same, there is a similar tendency that the lower the resistance of a load is (the more the output current is), the smaller the ripple becomes, and the higher the resistance of the load is (the less the output current is), the larger the ripple becomes.

SUMMARY OF THE INVENTION

An aspect of the present invention is a power supply apparatus capable of suppressing a variation in the ripple of an output voltage, even in a simple and low-cost power supply apparatus performing the feedback control.

Another aspect of the present invention is a power supply apparatus including a transformer including a primary side and a secondary side insulated with each other, a switching element configured to drive the transformer, the switching element connected to the primary side of the transformer, a control unit configured to output a pulse signal for driving the switching element, and a comparing unit configured to compare a target voltage of an output voltage output from the secondary side of the transformer and the output voltage, and control the output voltage to be the target voltage, wherein the comparing unit cuts off an input of the pulse signal to the switching element in a case where the output voltage is larger than the target voltage, and wherein the control unit determines a frequency or an on-duty ratio of the pulse signal according to the target voltage.

A further aspect of the present invention is an image forming apparatus including an image forming apparatus including an image forming unit configured to form an image, and a power supply apparatus configured to supply electric power to the image forming unit, wherein the power supply apparatus including a transformer including a primary side and a secondary side insulated with each other, a switching element configured to drive the transformer, the switching element connected to the primary side of the transformer, a control unit configured to output a pulse signal for driving the switching element, and a comparing unit configured to compare a target voltage of an output voltage that is output from the secondary side of the transformer and the output voltage, and control the output voltage to be the target voltage, wherein the comparing unit cuts off an input of the pulse signal to the switching element in a case where the output voltage is larger than the target voltage, and wherein the control unit determines a frequency or an on-duty ratio of the pulse signal according to the target voltage.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

[Power Supply Apparatus]

The configuration of a power supply apparatus is described by using FIG. 6. FIG. 6 is a circuit diagram of a power supply apparatus 200, which is a high voltage power supply. The power supply apparatus 200 includes resistances R101 to R107, capacitors C101 to C103, and diodes D101 and D102. The power supply apparatus 200 includes a field effect transistor (for example, a MOSFET) Q101 (hereinafter referred to as a FET Q101, which is a switching element, a high voltage transformer (hereinafter referred to as a transformer) T101, and a comparator CP101, which is a comparison device. The FET Q101 is connected to a primary side of the transformer T101. An output 1 is a part that outputs a high-voltage negative voltage. A power supply V1 is a power supply that generates a primary current of the transformer T101, and is, for example, a direct-current power supply having a comparatively high voltage such as 24 V. A power supply V2 is a power supply for a control circuit, and is, for example, a high precision direct-current power supply having a comparatively small voltage such as 3.3 V or 5 V. A pulse signal for driving the FET Q101 is input to an input 1 from a control unit such as a CPU. A PWM signal that determines the target voltage for the voltage output from the output 1 is similarly input to an input 2 from the control unit. Although a signal is input to the input 1 and the input 2 from the control unit such as a CPU that controls the power supply apparatus 200, the control unit may be provided in the power supply apparatus 200, or may be the control unit on the side of equipment mounted with the power supply apparatus 200, for example, an image forming apparatus.

The operation is described below. First, a pulse signal of 16 kHz and having a duty of about 10% is input to the input 1 from the control unit. The FET Q101 is turned on/off according to the input pulse signal, and an excitation current flows through the transformer T101. The transformer T101 is a transformer including a primary winding and a secondary winding, and the winding ratio is set to, for example, 84:2700, for pressure rising. The primary winding of the transformer T101 includes a center tap, and the current flowing through the primary winding flows in the order of V1→R107→T101→Q101 in a case where the FET Q101 is ON. On the other hand, in a case where the FET Q101 is OFF, a regenerative current flows in the order of T101→C103→D102. As for the operation of the secondary side of the transformer T101, in a case where the FET Q101 is ON, a diode D101 is in a conductive state, a current flows in the order of T101→GND→C102→D101, and a negative high voltage is output to the output 1. Note that, in a case where the direction of the diode D101 is reversed, a positive high voltage is output to the output 1.

Next, the feedback control is described. In a case where turning ON and OFF of the FET Q101 is repeated, and the negative voltage appearing in the output 1 is increased as an absolute value, the voltage applied to a non-inverted input terminal (+ terminal) of the comparator CP101 will gradually fall. The PWM signal that is input from the input 2 is integrated by an integration circuit formed by the resistance R103 and the capacitor C101, becomes a direct current voltage according to the duty of the PWM signal, and is input to an inverted input terminal (− terminal) of the comparator CP101. The PWM signal that is input to the inverted input terminal of the comparator CP101 is a signal corresponding to the target voltage for the voltage output from the output 1, and the off-duty is in a proportional relationship with the output voltage of the output 1. Here, the off-duty is the ratio defined by the cycle and the OFF width of the PWM signal.

Specifically, in a case where the negative voltage of the output 1 is increased as the absolute value, and the voltage that is input to the non-inverted input terminal of the comparator CP101 becomes less than the voltage that is being input to the inverted input terminal, the output of the comparator CP101 becomes a low level, and the gate voltage of the FET Q101 is made zero. In this state, even if a pulse signal is input from the input 1, a current is drawn by the comparator CP101. Therefore, while the voltage (the absolute value) of the output 1 is over the target voltage, the FET Q101 maintains an OFF state. In a case where that state is maintained for a while, the voltage (the absolute value) of the output 1 falls, and the potential relationship between the non-inverted input terminal and the inverted input terminal of the comparator CP101 is reversed. Then, the state where the gate voltage of the FET Q101 is made zero by the comparator CP101 is canceled, the FET Q101 resumes oscillation (ON/OFF) according to the pulse signal that is input from the input 1, and the output 1 (the absolute value) turns to increase again. The voltage of the output 1 is maintained at the target voltage by repeating such an operation.

Next, the problem is described. In a case where the load connected to the output 1 is a resistance load and is constant (the resistance value is constant), the higher the voltage of the output 1 is, the more the current flows into the load. Therefore, in order to maintain the voltage, the FET Q101 needs to perform many oscillations. That is, the oscillating frequency of the FET Q101 becomes high. Conversely, in a case where the voltage of the output 1 is low, since the voltage can be maintained with a slight oscillation, the oscillating frequency of the FET Q101 becomes low. FIG. 7A and FIG. 7B are graphs illustrating this situation.

FIG. 7A illustrates the case where the output voltage is high, and FIG. 7B illustrates the case where the output voltage is low. Additionally, in each of the graphs, a solid line indicates the output voltage, and a broken line indicates the target voltage (the average voltage) of the output voltage in (i). In (i), the ripple width of the output voltage is indicated by Rwa and Rwb. Additionally, the pulse signal, which is a driving signal of the FET Q101, is illustrated in (ii). Each horizontal axis represents the time. Here, the driving signal is a signal that is input to the gate terminal of the FET Q101, and is a signal obtained after the pulse signal that is input from the input 1 is subjected to the effect of the comparator CP101 (hereinafter expressed as having been thinned out). As described above, since the current is drawn by the comparator CP101 when the output of the comparator CP101 is at a low level by the feedback control, the pulse signal from the input 1 is not input to the FET Q101. The comparator CP101 cuts off the input of the pulse signal to the FET Q101 in a case where the output voltage is larger than the target voltage. This state is expressed as "the pulse signal is thinned out."

As can be seen from FIG. 7A and FIG. 7B, there is a difference in the frequency and amplitude (Rwa and Rwb in the figures) of the ripple of the output voltage between the case where the output voltage is high and the case where the output voltage is low (Rwa<Rwb). In a case where the output voltage is high in FIG. 7A, since the ratio of thinning out by the comparator CP101 is low, the time during which the FET Q101 is oscillating is long. In a case where the output voltage is high, since there is also much output current, the output voltage gently rises, and in a case where the oscillation stops when the output voltage exceeds the target voltage, the output voltage decreases in a short time. On the other hand, in a case where the output voltage is low in FIG. 7B, the ratio of thinning out by the comparator CP101 is high, and basically, the oscillation is stopped. In a case where the output voltage becomes lower than the target voltage, oscillation is slightly performed, but since the output voltage is low, that is, the output current is also low, the output voltage significantly rises even with a slight oscillation, and is overshot. This is caused by the lag element of the feedback control. Even if this lag element does not exist, in a case where the output voltage is further low, it is also considered that the supply of electric charge becomes excessive even by turning ON/OFF the FET Q101, and the output voltage overshoots the target voltage.

In this manner, in the circuit of this system, there is a tendency that the higher the voltage that is being output is, the smaller the ripple of the output voltage becomes, and the lower the voltage that is being output is, the larger the ripple of the output voltage becomes. Additionally, as described above, since this tendency is caused by the output current, there is a similar tendency that, even if the output voltage is the same, the lower the load resistance is (the more the output current flows), the smaller the ripple becomes, and the higher the load resistance is (the less the output current flows), the larger the ripple becomes.

Example 1

The power supply apparatus of the present invention is applied to, for example, an image forming apparatus. Therefore, a laser printer, which is a kind of the image forming apparatus, is first described.

[The Configuration of Image Forming Apparatus]

Figure 1:
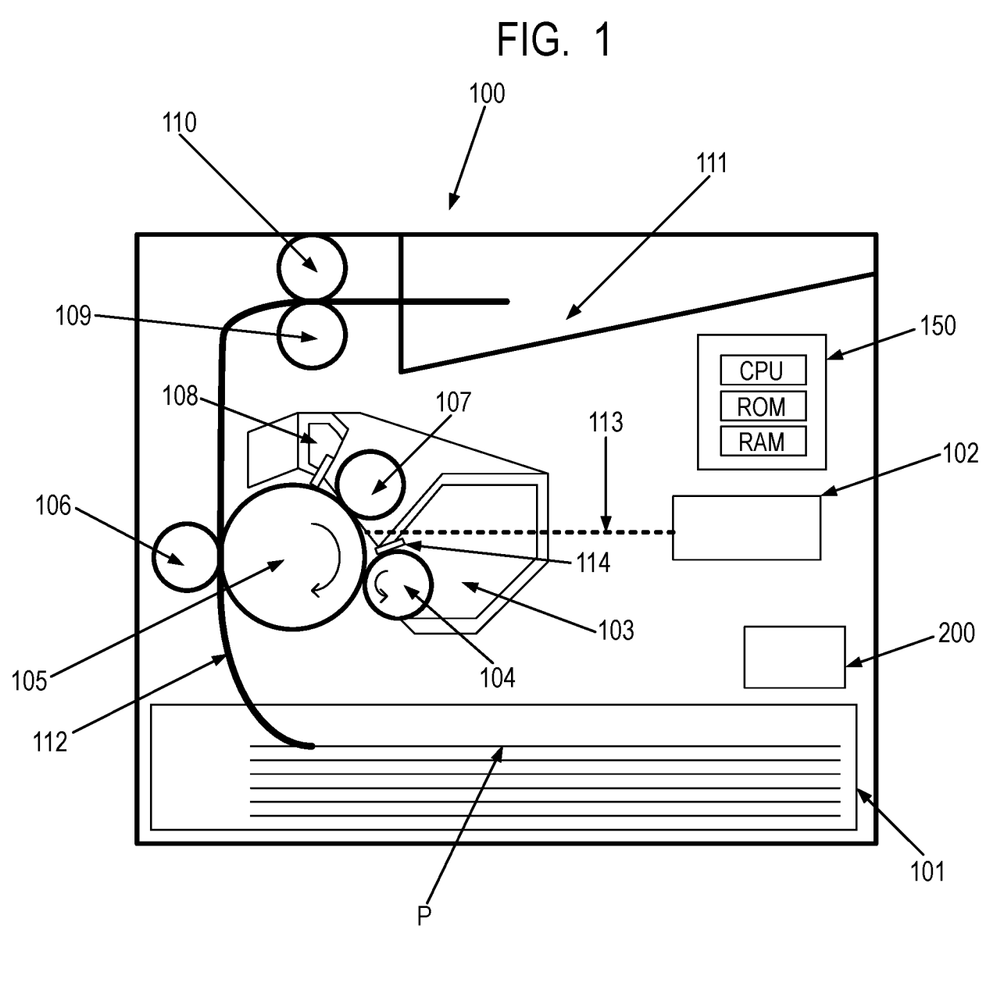
FIG. 1 is a diagram illustrating the configuration of an image forming apparatus in Examples 1 to 4.

FIG. 1 illustrates a cross-sectional view of a monochrome laser printer (hereinafter referred to as the printer) 100 in Example 1. The printer 100 includes a sheet feeding unit 101, a laser scanner 102, which is an exposure device, a toner tank 103, a developing roller 104, which is a developing device, a photosensitive drum 105, which is a photosensitive member, a transfer roller 106, which is a transfer device, a charge roller 107, and a waste toner tank 108. Additionally, the printer 100 includes a fixing roller 109, a pressure roller 110, a discharge unit 111, a conveyance path 112, and a developing blade 114. The sheet feeding unit 101 is a sheet feeding unit storing a recording medium (for example, paper P) on which printing is to be performed, and the paper P is stacked inside the sheet feeding unit 101. The laser scanner 102 irradiates laser light 113 to the photosensitive drum 105. The optical path of the laser light 113 at this moment is indicated by a broken line. The toner tank 103 internally stores a magnetic body toner. The conveyance path 112 is a route along which the paper P is conveyed. The developing blade 114 is a blade regulating the toner amount on the developing roller 104.

The printer 100 includes a control unit 150, which is a control device controlling the entire image forming operation described below. The control unit 150 includes a CPU, a ROM and a RAM. The control unit 150 reads various kinds of programs, various kinds of tables, constants, etc. stored in the ROM, and executes the read programs while using the RAM as a working area. Additionally, the control unit 150 may output the pulse signal having a predetermined frequency and a predetermined duty to the input 1 of the power supply apparatus 200. The control unit 150 may output the PWM signal corresponding to a predetermined voltage to the input 2 of the power supply apparatus 200.

[Description of Operation of Printer]

Subsequently, a description of the operation of the printer 100 is given. In a case where the printer 100 receives a print job, each of the rollers and the laser scanner 102 included in the printer 100 start operation. Electric power is supplied to the charge roller 107 from a circuit board (not shown) of the power supply apparatus 200, the charge roller 107 carries a negative high voltage, and charges a surface of the photosensitive drum 105. For example, in a case where an image signal is transmitted from an external device such as a personal computer, the laser scanner 102 scans the surface of the photosensitive drum 105 in a longitudinal direction (a rotation axial direction of the photosensitive drum 105), while blinking the laser light 113 according to pixels in connection with the image signal. In the photosensitive drum 105, the electric charge disappears in the part to which the laser light 113 is irradiated, and a latent image is formed. A negative high pressure is supplied to the developing roller 104, and a magnet is included inside the developing roller 104, a magnetic body toner in the toner tank 103 is drawn by a magnetic force, and the toner is moved to the photosensitive drum 105 according to the latent image by the electrostatic force. Accordingly, a toner image is formed on the photosensitive drum 105. Additionally, the developing blade 114 is given a potential difference of, for example, about several hundred volts with respect to the developing roller 104. Therefore, the toner on the developing roller 104 is uniformly coated by the electrostatic force as well as the physical regulation by the developing blade 114 body.

On the other hand, the paper P fed from the sheet feeding unit 101 is conveyed along the conveyance path 112, and is sandwiched by a nip portion formed by the transfer roller 106 and the photosensitive drum 105. On this occasion, a positive high voltage is applied to the transfer roller 106, and the toner on the photosensitive drum 105 is transferred to the paper P in the manner of being drawn to the transfer roller 106. Then, the paper P on which the toner was transferred is conveyed toward the discharge unit 111, and is sandwiched by a nip portion formed by the fixing roller 109 and the pressure roller 110. Here, the paper P is heated to, for example, several hundred degrees by the fixing roller 109 and is pressed by the pressure roller 110, and the toner that has been placed on the paper P only with the electrostatic force (that is, unfixed toner) is fixed to the paper P. The paper P after fixing processing is discharged to and stacked in the discharge unit 111. On the other hand, even after the transfer to the paper P is performed, a little toner remains on the surface of the photosensitive drum 105. Although, ideally, all the toner should be transferred to the paper P, since the charge amount carried by the toner is not actually uniform, there is a toner remaining on the photosensitive drum 105 after the transfer. The waste toner tank 108 is a place that strips off and collects the toner remaining on the photosensitive drum 105 by the blade made to contact the photosensitive drum 105. Accordingly, the toner is removed from the photosensitive drum 105, the photosensitive drum 105 is charged again by the charge roller 107, and the next latent image will be drawn by the laser scanner 102. The printer 100 forms an image by repeating the above operation.

[Description of Circuit of Power Supply Apparatus]

In this manner, the printer 100 requires various kinds of high voltages, and includes the high voltage generating circuit for the high voltages. A kind of the circuit of the power supply apparatus 200 as the high voltage generating circuit is the system described with FIG. 6, and the present invention devises the control method of the power supply apparatus 200 in FIG. 6, thereby solving the above-described problem in the circuit in FIG. 6. The circuit in FIG. 6 is employed as the circuit of the power supply apparatus 200 in Example 1.

In the circuit in FIG. 6, the lower the output voltage is, the larger the ripple becomes, and the higher the output voltage is, the smaller the ripple becomes. As illustrated in FIG. 7A and FIG. 7B, the less the amount of the pulse signal that is thinned out by the comparator CP101 becomes, the smaller the ripple becomes as well. From the tendency, ultimately, it can be said that the state where the pulse signal is not thinned out at all by the comparator CP101 is the state where the ripple is the smallest. Here, the state where the pulse signal is not thinned out at all is the state where the output voltage can be exactly adjusted to the target voltage, in a case where the FET Q101 is directly driven by the frequency of the pulse signal (the duty) that is input to the input 1. However, practically, in the circuit in FIG. 6, the control unit 150 cannot recognize the magnitude of a load current. Therefore, as for the pulse signal that is input to the input 1, the drive frequency (the duty) having the largest supply capacity in the assumed load range is input, and the balance is maintained by thinning out an unnecessary portion of the supply capacity by the comparator CP101.

However, although the amount thinned out by the comparator CP101 cannot be made zero, the amount can be reduced. In a case where it is expected that the amount thinned out will be increased, since the pulse signal excessively supplied with respect to the charge amount required by the load is thinned out by the comparator CP101, the frequency or the duty of pulse signal that is input to the input 1 may be decreased.

Therefore, in the present invention, since it is considered that, in a case where the target voltage that is input to the input 2 as the PWM signal is high, a lot of output current flows and the amount thinned out is less, the pulse signal that is input to the input 1 is assumed to be a pulse signal having a comparatively high frequency or a comparatively high duty. Conversely, in a case where the target voltage is low, since it is expected that the output current is low, and the amount thinned out is increased, the pulse signal that is input to the input 1 is modified into a pulse signal having a low frequency or a low duty, thereby decreasing the amount thinned out, and reducing the ripple of the output voltage. That is, in Example 1, the pulse signal that is input to the input 1 is configured such that the frequency or duty is modified according to the target value (the target voltage) of the output voltage.

[Setting of Pulse Signal and PWM Signal]

Figure 2:
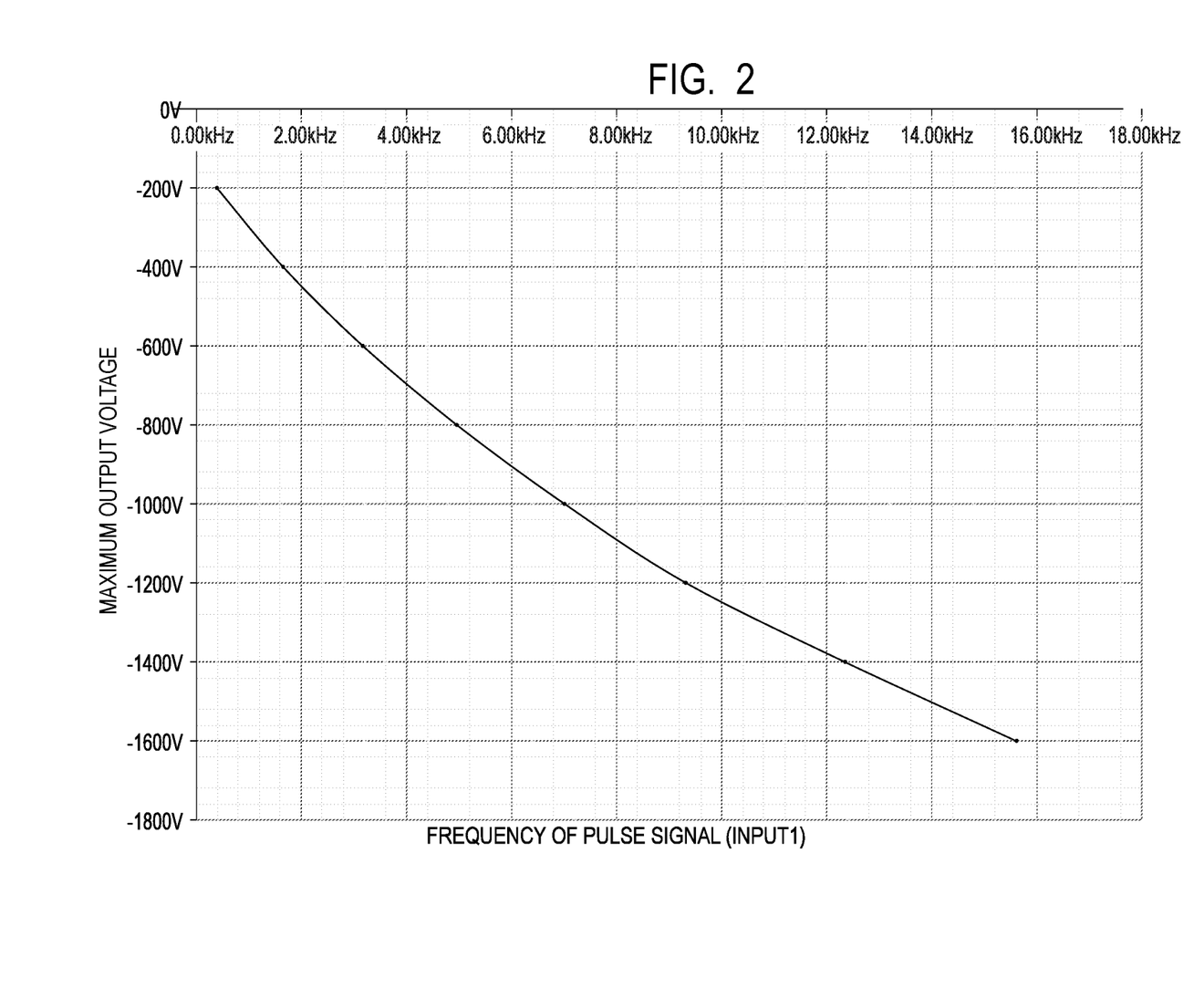
FIG. 2 is a graph illustrating the relationship between the frequency of a pulse signal and an output voltage in Example 1.

A specific designing method is exemplified. First, in a case of a certain load condition, that is, in a case where the load has a predetermined resistance value, for example, the resistance R105 is removed from the circuit in FIG. 6, and the pulse signal of the input 1 is fully prevented from being thinned out by the comparator CP101. In addition, the on-duty ratio of the pulse signal that is input to the input 1 is fixed to a predetermined on-duty ratio, for example, 10%, and the voltage appearing in the output 1 in a case where the frequency of the pulse signal is changed is observed. The result is illustrated in FIG. 2. In FIG. 2, a horizontal axis represents the frequency of the pulse signal that is input to the input 1, and a vertical axis represents the maximum output voltage that is output from the output 1. As illustrated in FIG. 2, the larger the frequency of the pulse signal becomes, the greater the absolute value of the output voltage from the output 1 becomes. In other words, the greater the absolute value of the output voltage is, the larger the frequency of the pulse signal becomes. That is, FIG. 2 illustrates the maximum output voltage (the absolute value) for each frequency of the pulse signal under a predetermined load condition. The maximum output voltage means that the voltage does not become higher than that (the absolute value) at the frequency. For example, when the frequency of the pulse signal is 7.00 kHz, the maximum output voltage is −1000 V in the load. This means that the output voltage of the output 1 never becomes, for example, −1200 V, in a case where the frequency of the pulse signal is 7.00 kHz. Therefore, in the circuit in FIG. 6, in a case where it is desired to set the target voltage to, for example, −1000 V, referring to FIG. 2, the pulse signal having a frequency of 7 kHz may be input to the input 1.

On this occasion, the PWM signal corresponding to the target voltage of −1000 V is input to the input 2. The object for this is to correspond to a load variation. Since FIG. 2 illustrates the characteristic with respect to a certain specific load, if the load is changed, the characteristic of FIG. 2 is also changed. In a case where the circuit in FIG. 6 is mounted in the printer 100, since the load connected to the output 1 is determined, such as the paper P and the photosensitive drum 105 for charging, and the paper P and the transfer roller 106 for transfer, the maximum output voltage of the output voltage can be predicted to some extent. However, since the resistance value of the load is changed due to the variation in components, the environmental temperature/humidity, the moisture absorption state of the paper P, the position of the paper during conveyance, etc., the assumption range of the maximum output voltage is made flexible. Thus, FIG. 2 is merely a guide (that is, coarse control), and the characteristic in FIG. 2 is used in order to lessen the amount thinned out by the comparator CP101 as much as possible. Eventually, the output voltage is matched by thinning out the pulse signal by the comparator CP101 (that is, fine control). Similarly, in a case where it is desired to set the target voltage of the output voltage to −1500 V, the pulse signal of 14 kHz may be input to the input 1, and the PWM signal corresponding to −1500 V may be input to the input 2. Additionally, in a case where it is desired to set the target voltage of the output voltage to −800V, the pulse signal of 5 kHz may be input to the input 1, and the PWM signal corresponding to −800 V may be input to the input 2. In this case, the characteristic (the information associating the frequency of the pulse signal with the maximum output voltage) in FIG. 2 may be stored in the ROM of the control unit 150 previously mentioned above.

In a case where the target voltage of the output voltage correspond to the frequency of the pulse signal in 1 to 1 as a data table, a method as described above may be used. In a case where more seamless control is desired, the following method is also considered. First, the approximation formula for the graph in FIG. 2 is obtained, and let this formula be Formula 1 (for example, y=f(x)). As to this Formula 1, the solution obtained in a case where the target voltage is input to the paragraph (y) of the output voltage is the coarsely controlled optimum frequency ($x=f^1(y)$) at that target voltage.

Figure 3A:
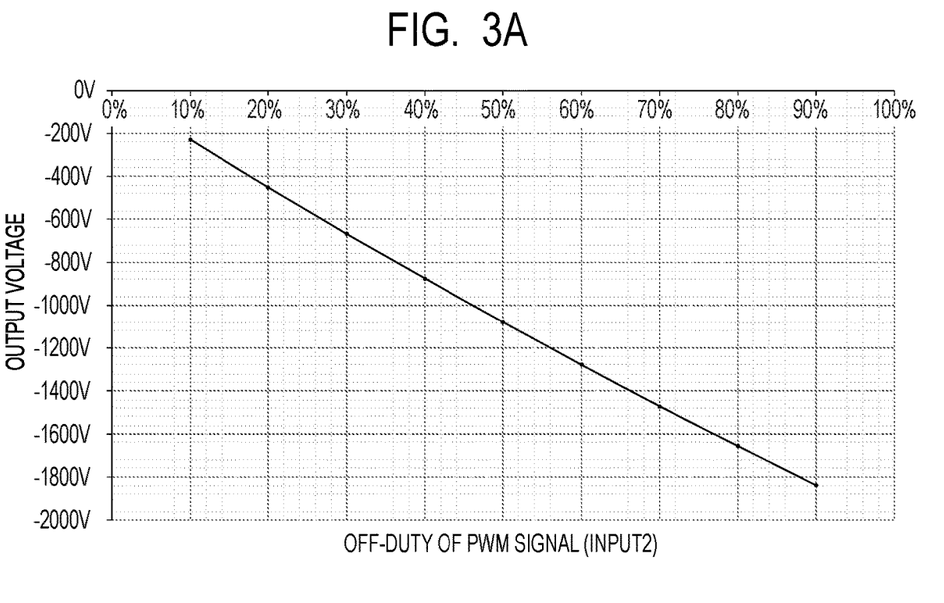
FIG. 3A and FIG. 3B are graphs illustrating the relationship between the off-duty of a PWM signal and the output voltage, and the relationship between the output voltage and a ripple width in Example 1, respectively.

Additionally, FIG. 3A illustrates the graph showing the relationship between the off-duty of the PWM signal that is input to the input 2 and the output voltage. In FIG. 3A, a horizontal axis represents the off-duty of the PWM signal, and a vertical axis represents the output voltage of the output 1. As illustrated in FIG. 3A, the larger the off-duty of the PWM signal that is input to the input 2 becomes, the larger the absolute value of the output voltage from the output 1 becomes. An approximation formula is also obtained for the graph in FIG. 3A, and let this formula be Formula 2 (for example, y=g(x)). Also as to Formula 2, the same value as the target voltage that is input to Formula 1 is input to the paragraph (y) of the output voltage, and the value of the off-duty of the PWM signal ($x=g^{-1}(y)$) is obtained as the solution. The PWM signal as the value of the off-duty of the obtained PWM signal is input from the input 2, and the pulse signal having the optimum frequency ($x=f^1(y)$) obtained by the above-described method is input to the input 1. Accordingly, the ripple of the output voltage can be reduced with respect to various target voltages.

Figure 3B:
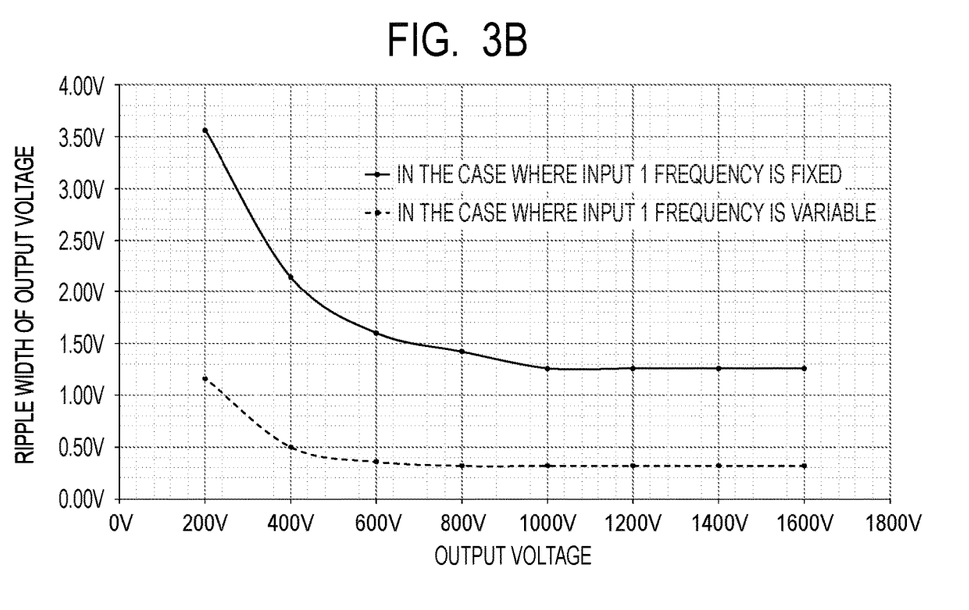

FIG. 3B is a graph showing the relationship between the ripple width of the output voltage and the output voltage in a case where the frequency of the pulse signal of the input 1 is actually made variable. In FIG. 3B, a horizontal axis represents the output voltage of the output 1, and a vertical axis represents the ripple width of the output voltage of the output 1. In FIG. 3B, a solid line indicates the case where the frequency of the pulse signal that is input to the input 1 is fixed (conventional control), and a broken line indicates the case where the frequency of the pulse signal that is input to the input 1 is made variable (control in Example 1). As illustrated in FIG. 3B, it can be seen that, compared with the case where the frequency of the pulse signal that is input to the input 1 is fixed, in the case where the frequency of the pulse signal is variable, the ripple width of the output voltage is generally small.

Ideally, it is better to drive at the frequency at which no thinning out is performed at all by the comparator CP101 at each output voltage. In a case where the circuit in FIG. 6 can be modified, there is a method of adding a circuit for detecting the amount thinned out by the comparator CP101, for example, a method of monitoring the gate voltage of the FET Q101 by the control unit 150 (the CPU). Additionally, in the first place, the output voltage may be directly monitored by the control unit 150 without using the comparator CP101, and the driving signal of the FET Q101 may be controlled by calculation. However, this is so-called digital control, and the control unit 150 capable of performing high speed processing is required.

In this manner, although having a low-cost circuit configuration that maintains the output voltage to be constant, the present invention can obtain the following effects by thinning out the pulse signal for driving the FET Q101 that drives the transformer T101. That is, the ripple of the output voltage is suppressed by changing the frequency of the pulse signal of the input 1 so as not to be thinned out by the comparator CP101 as much as possible.

As described above, according to Example 1, even in a simple and low-cost power supply apparatus performing the feedback control, a variation in the ripple of the output voltage can be suppressed.

[Setting of Pulse Signal and PWM Signal]

Figure 4:
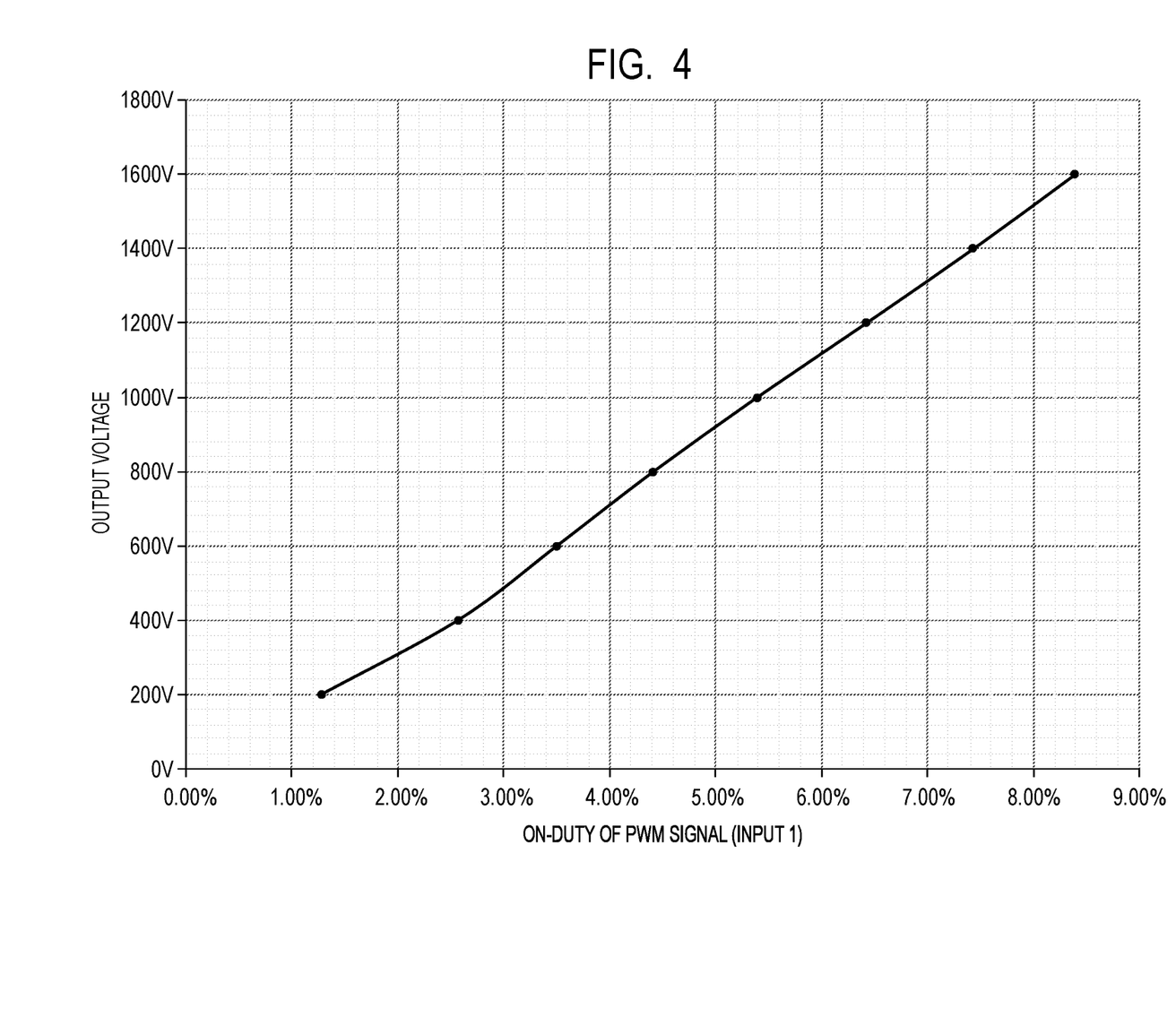
FIG. 4 is a graph illustrating the relationship between the off-duty of the PWM signal and the output voltage in Example 2.

In Example 1, the method is shown that reduces the ripple of the output voltage by changing the frequency of the pulse signal that is input to the input 1, according to the output voltage. Here, similar control can be performed even if, instead of the frequency of the pulse signal, the duty of the pulse signal that is input to the input 1 is changed. As in Example 1, under a certain load condition (the load has a predetermined resistance value), for example, the resistance R105 is removed from the circuit of FIG. 6, and the pulse signal of the input 1 is fully prevented from being thinned out by the comparator CP101. In addition, as for the pulse signal that is input to the input 1, the frequency is fixed to a predetermined frequency, for example, 25 kHz, and the voltage that is output to the output 1 in a case where the on-duty ratio is changed is observed. Assume that the result is as shown in FIG. 4. In FIG. 4, a horizontal axis represents the on-duty ratio of the pulse signal that is input to the input 1, and a vertical axis represents the output voltage that is output from the output 1. As illustrated in FIG. 4, the larger the on-duty ratio of the pulse signal becomes, the larger the absolute value of the output voltage from the output 1 becomes. In other words, the larger the absolute value of the output voltage is, the larger the on-duty ratio of the pulse signal becomes.

Then, as in Example 1, in a case where it is desired to set the target voltage to 1400 V, the pulse signal having an on-duty ratio of 7.5% may be input to the input 1, and the PWM signal corresponding to 1400 V may be input to the input 2. Additionally, in a case where it is desired to set the target voltage to 600 V, the pulse signal having an on-duty ratio of 3.5% may be input to the input 1, and the PWM signal corresponding to 600 V may be input to the input 2. Further, as in Formula 1 in Example 1, the approximation formula for the graph in FIG. 4 may be obtained, so as to obtain the on-duty ratio of the pulse signal that is input to the input 1 from a predetermined output voltage. Since the input 2 is similar to that in Example 1, a description is omitted.

As described above, according to Example 2, even in a simple and low-cost power supply apparatus performing the feedback control, a variation in the ripple of the output voltage can be suppressed.

Example 3

[Setting of Pulse Signal and PWM Signal]

In Examples 1 and 2, a description has been given of changing the frequency or on-duty ratio of the pulse signal that is input to the input 1, according to the voltage value to be output, or the assumed load. However, the frequency or duty of the pulse signal that is input to the input 1 may be changed according to a time-varying load.

For example, the printer 100 in FIG. 1 forms an image in a series of operations as shown in Example 1. Therefore, for example, the moment at which the fed paper P touches the photosensitive drum 105 can be predicted. Since the paper P, which is a resistor, enters the place where the transfer roller 106 and the photosensitive drum 105 touch each other until then, from a viewpoint of a high voltage power supply, it seems that the load resistance becomes high at the moment. Note that the load at this moment is referred to the transfer load. As described above, the ripple become large in a case where the load resistance becomes high. Therefore, there is also a method of reducing the ripple of the output voltage by predicting the timing at which the transfer load becomes high, and by reducing the frequency (or on-duty ratio) of the pulse signal that is input to the input 1 immediately before the paper P contacts the photosensitive drum 105.

Additionally, operating at a frequency having a less ripple of the output voltage means that there is a less remaining power of output ability. Therefore, in a case where the current beyond assumption flows into the load, there is a possibility that the output voltage may decline. For example, in a highly humid environment, the paper P absorbs moisture, and the resistance value of the paper P is remarkably falls. Therefore, in a case where the paper P extends across the transfer roller 106 and a sheet metal (a part connected to the GND) in the printer 100 body, etc. since the transfer current leaks to the GND through the paper P, the transfer load may temporarily look heavy. In such a case, the deterioration of the output voltage can be suppressed by increasing the frequency (or on-duty ratio) of the pulse signal that is input to the input 1 at the time when the paper P passes through the zone.

As described above, according to Example 3, even in a simple and low-cost power supply apparatus performing the feedback control, a variation in the ripple of the output voltage can be suppressed.

Example 4

[Setting of Pulse Signal and PWM Signal]

Figure 5A:
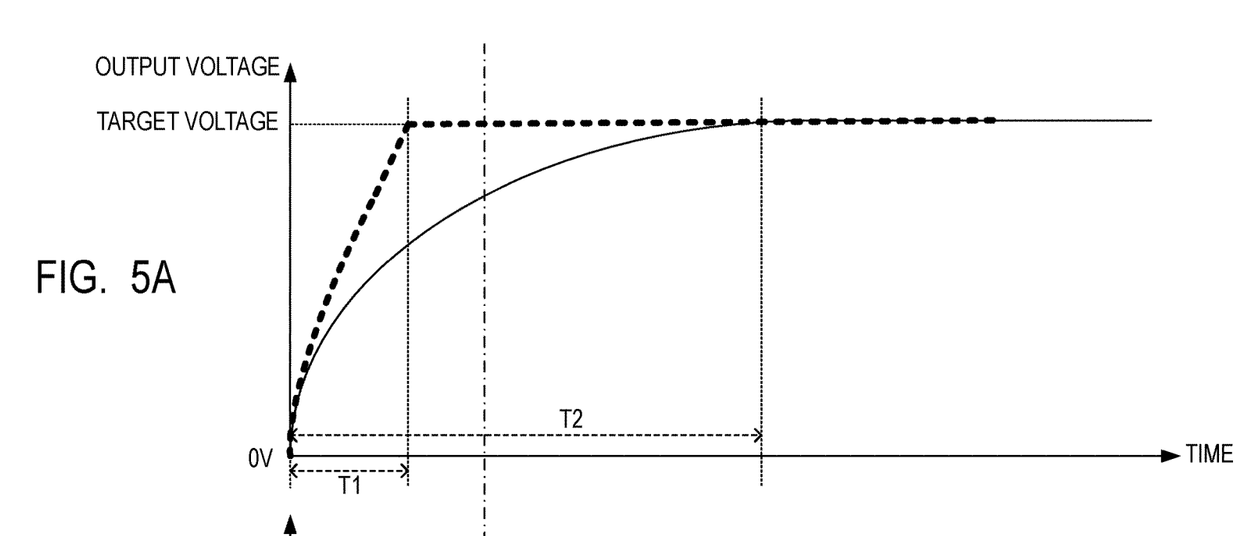
FIG. 5A and FIG. 5B are graphs illustrating the transition of the output voltage and the transition of the frequency of the PWM signal in Example 4, respectively.
Figure 5B:
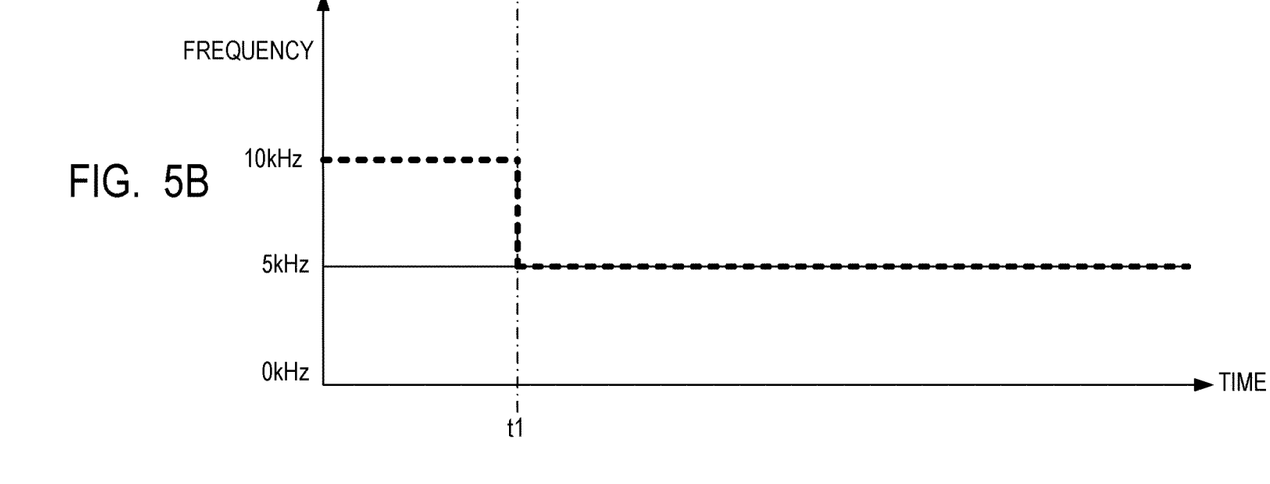

There are other situations where there is an advantage by changing the frequency of the pulse signal that is input to the input 1. For example, by temporarily making the frequency of the pulse signal high at the time of the rising of the output voltage, the time until the target voltage is reached can be shortened. The situation is illustrated in FIG. 5A and FIG. 5B. FIG. 5A illustrates the time variation of the output voltage, and FIG. 5B illustrates the time variation of the frequency of the pulse signal that is input to the input 1. FIG. 5A also illustrates times T1 and T2 until both output voltages rise to the target voltage. Both time axes are the same, and a one-dot-chain line indicates the same timing t1. Additionally, a solid line indicates the case where the frequency of the pulse signal that is input to the input 1 is fixed to 5 kHz, and a thick dashed line indicates the case where the pulse signal is moved at a double frequency, i.e., 10 kHz only for a certain period of time at the time of the rising.

In Example 4, at the time when the power supply apparatus 200 is started, the control unit 150 outputs, to the input 1, the pulse signal having a higher frequency (10 kHz) than the frequency (for example, 5 kHz) according to the target voltage until the timing t1, which is a predetermined timing. Additionally, the control unit 150 outputs, to the input 1, the pulse signal having a frequency (5 kHz) according to the target voltage, after the timing t1 (after the predetermined timing). In this manner, by performing operation by setting the frequency of the pulse signal from the rising to the timing t1 to 10 kHz, the speed with which the output voltage reaches the target voltage becomes faster as illustrated in FIG. 5A, and the time until the target voltage is reached becomes short (T1<T2). Since the portion exceeding the target voltage is thinned out by the comparator CP101, the output voltage never directly exceeds the target voltage. Thus, the certain period of time may be a period of time having a necessary and sufficient length required for the output voltage to reach the target voltage, and thereafter, by reducing the frequency of the pulse signal to 5 kHz, the suppression of the ripple is started. This method is effective not only at the time of the rising, but also immediately after the target voltage is changed from a low voltage to a high voltage, for example. That is, in a circumstance where a high voltage of, for example, 1000 V is being output from the output 1 during the image forming operation, in a case where the output of, for example, 2000 V is required, the above-described control becomes effective. Additionally, as in Example 2, not the frequency but the on-duty ratio of the pulse signal may be switched at the timing t1.

As described above, according to Example 4, even in a simple and low-cost power supply apparatus performing the feedback control, a variation in the ripple of the output voltage can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-109580, filed Jun. 7, 2018, which is hereby incorporated by reference herein in its entirety.

What is claimed is:

1. A power supply apparatus comprising:
   a transformer including a primary side and a secondary side insulated with each other;
   a switching element connected to the primary side of the transformer, the switching element configured to be driven to drive the transformer;
   a control unit configured to output a pulse signal to drive the switching element and a PWM (Pulse Width Modulation) signal to set a target voltage of an output voltage on the secondary side of the transformer; and
   a comparing unit configured to compare the PWM signal with a feedback signal according to the output voltage,
   wherein the pulse signal is adjusted as an adjusted pulse signal according to a comparison result by the comparing unit, and the switching element is driven by the adjusted pulse signal,
   wherein, in a case where the control unit determines that an absolute value of the output voltage becomes a first value based on a load connected to the secondary side of the transformer, the control unit changes a frequency of the pulse signal to a first frequency corresponding to the first value, and
   in a case where the control unit determines that the absolute value of the output voltage becomes a second value smaller than the first value based on the load connected to the secondary side of the transformer, the control unit changes the frequency of the pulse signal to a second frequency corresponding to the second value, the second frequency being smaller than the first frequency.

2. The power supply apparatus according to claim 1, wherein in a case where the load connected to the secondary side of the transformer has a predetermined resistance value, and the pulse signal has a predetermined on-duty ratio, the smaller the absolute value of the output voltage is, the smaller the frequency becomes.

3. The power supply apparatus according to claim 1, wherein in a case where the load connected to the secondary side of the transformer has a predetermined resistance value, and the pulse signal has a predetermined frequency, the smaller the absolute value of the output voltage is, the smaller the on-duty ratio becomes.

4. The power supply apparatus according to claim 1, wherein the comparing unit is a comparator, and
   wherein a voltage according to the output voltage is input to a non-inverted input terminal of the comparator, and the PWM signal according to the target voltage is input to an inverted input terminal of the comparator.

5. The power supply apparatus according to claim 1,
wherein in the case where the control unit determines that the absolute value of the output voltage becomes the first value, the control unit changes an off-duty of the PWM signal to a first ratio corresponding to the first value, and
in the case where the control unit determines that the absolute value of the output voltage becomes the second value, the control unit changes the off-duty of the PWM signal to a second ratio corresponding to the second value, the second ratio being smaller than the first ratio.

6. The power supply apparatus according to claim 1,
wherein the pulse signal is thinned out and outputted as the adjusted pulse signal according to the comparison result by the comparing unit.

7. An image forming apparatus comprising:
an image forming unit configured to form an image; and
a power supply apparatus configured to supply electric power to the image forming unit,
wherein the power supply apparatus comprises:
a transformer including a primary side and a secondary side insulated with each other;
a switching element configured to drive the transformer, the switching element connected to the primary side of the transformer, the switching element configured to be driven to drive the transformer;
a control unit configured to output a pulse signal to drive the switching element and a PWM (Pulse Width Modulation) signal to set a target voltage of an output voltage on the secondary side of the transformer; and
a comparing unit configured to compare the PWM signal with a feedback signal according to the output voltage,
wherein the pulse signal is adjusted as an adjusted pulse signal according to a comparison result by the comparing unit, and the switching element is driven by the adjusted pulse signal,
wherein, in a case where the control unit determines that an absolute value of the output voltage becomes a first value based on a load connected to the secondary side of the transformer, the control unit changes a frequency of the pulse signal to a first frequency corresponding to the first value, and
in a case where the control unit determines that the absolute value of the output voltage becomes a second value smaller than the first value based on the load connected to the secondary side of the transformer, the control unit changes the frequency of the pulse signal to a second frequency corresponding to the second value, the second frequency being smaller than the first frequency.

8. The image forming apparatus according to claim 7, comprising a photosensitive member on which the image is formed,
wherein the image forming unit includes a developing unit configured to develop a latent image formed on the photosensitive member to form a toner image, and a transfer unit configured to transfer the toner image to a recording medium.

9. The image forming apparatus according to claim 8,
wherein the control unit is configured to control the power supply apparatus, and
wherein the control unit switches the frequency or the on-duty ratio of the pulse signal based on a timing at which the toner image is transferred to the recording medium by the transfer unit.

10. The image forming apparatus according to claim 7,
wherein the control unit is configured to control the power supply apparatus, and
wherein at a time when the power supply apparatus is started, the control unit outputs the pulse signal having one of a higher frequency than the frequency according to the target voltage and a larger on-duty ratio than the on-duty ratio according to the target voltage until a predetermined timing, and outputs the pulse signal having the frequency or the on-duty ratio according to the target voltage after the predetermined timing.

11. The image forming apparatus according to claim 7,
wherein the control unit is configured to control the power supply apparatus, and
wherein at the time when the target voltage is switched, the control unit switches the frequency or the on-duty ratio of the pulse signal.

12. The image forming apparatus according to claim 7,
wherein in the case where the control unit determines that the absolute value of the output voltage becomes the first value, the control unit changes an off-duty of the PWM signal to a first ratio corresponding to the first value, and
in the case where the control unit determines that the absolute value of the output voltage becomes the second value, the control unit changes the off-duty of the PWM signal to a second ratio corresponding to the second value, the second ratio being smaller than the first ratio.

13. The image forming apparatus according to claim 7,
wherein the pulse signal is thinned out and outputted as the adjusted pulse signal according to the comparison result by the comparing unit.

* * * * *